United States Patent [19]
Hauer et al.

[11] Patent Number: 6,053,538
[45] Date of Patent: Apr. 25, 2000

[54] BALL AND SOCKET JOINT FOR THE WATERPROOF ASSEMBLY OF TWO PIPE ELEMENTS

[75] Inventors: Jean-Claude Hauer, Saulxures les Nancy; Francis Berthon, Pompey, both of France

[73] Assignee: Pont-a-Mousson, Pont-a-Mousson Cedex, France

[21] Appl. No.: 09/182,240

[22] Filed: Oct. 30, 1998

[30] Foreign Application Priority Data

Oct. 30, 1997 [FR] France ................................. 97 13813

[51] Int. Cl.[7] ................................................. F16L 27/04
[52] U.S. Cl. ................................. 285/261; 285/133.21
[58] Field of Search ............................ 285/261, 121.7, 285/138.1, 145.3, 146.1, 146.2, 146.3, 133.21

[56] References Cited

U.S. PATENT DOCUMENTS

| | | | |
|---|---|---|---|
| 2,040,008 | 5/1936 | Kreidel | 285/261 |
| 2,277,990 | 3/1942 | Lanninger | 285/261 |
| 2,971,701 | 2/1961 | Shames et al. | 285/261 |
| 4,129,306 | 12/1978 | Konno et al. | 285/261 |
| 5,806,896 | 9/1998 | Sato et al. | 285/261 |

FOREIGN PATENT DOCUMENTS

| | | | |
|---|---|---|---|
| 393763 | of 1933 | Belgium . | |
| 226 573 | 6/1987 | European Pat. Off. . | |
| 2305676 | 10/1976 | France | 285/261 |
| 2 596 492 | 10/1987 | France . | |
| 73615 | 6/1978 | Japan | 285/261 |

*Primary Examiner*—Dave W. Arola
*Attorney, Agent, or Firm*—Sughrue, Mion, Zinn Macpeak & Seas, PLLC

[57] ABSTRACT

A ball-and-socket joint of the type where the male end (1) of a first pipe element (2) has a spherical saddle (5) designed to be inserted and pivot in a specially designed housing with a spherical profile (11) which is set on the Y—Y axis socket of a second pipe element (4). A waterproof elastomer ring gasket (16) is set in a ring groove (15) in the socket's (3) internal surface. The groove is designed and located in such a way that it forms an expansion chamber for the elastomer of the gasket during the insertion of the spherical saddle into the socket and insures, in a locked position, the pressing of the gasket on the outside surface of the saddle located beyond the maximum diameter of said saddle measured in a direction perpendicular to the axis Y—Y of the socket. The gasket is thus subjected to a residual radial compression that guarantees the waterproofness of the assembly and simultaneously prohibits the dislocation of the pipe elements.

5 Claims, 1 Drawing Sheet

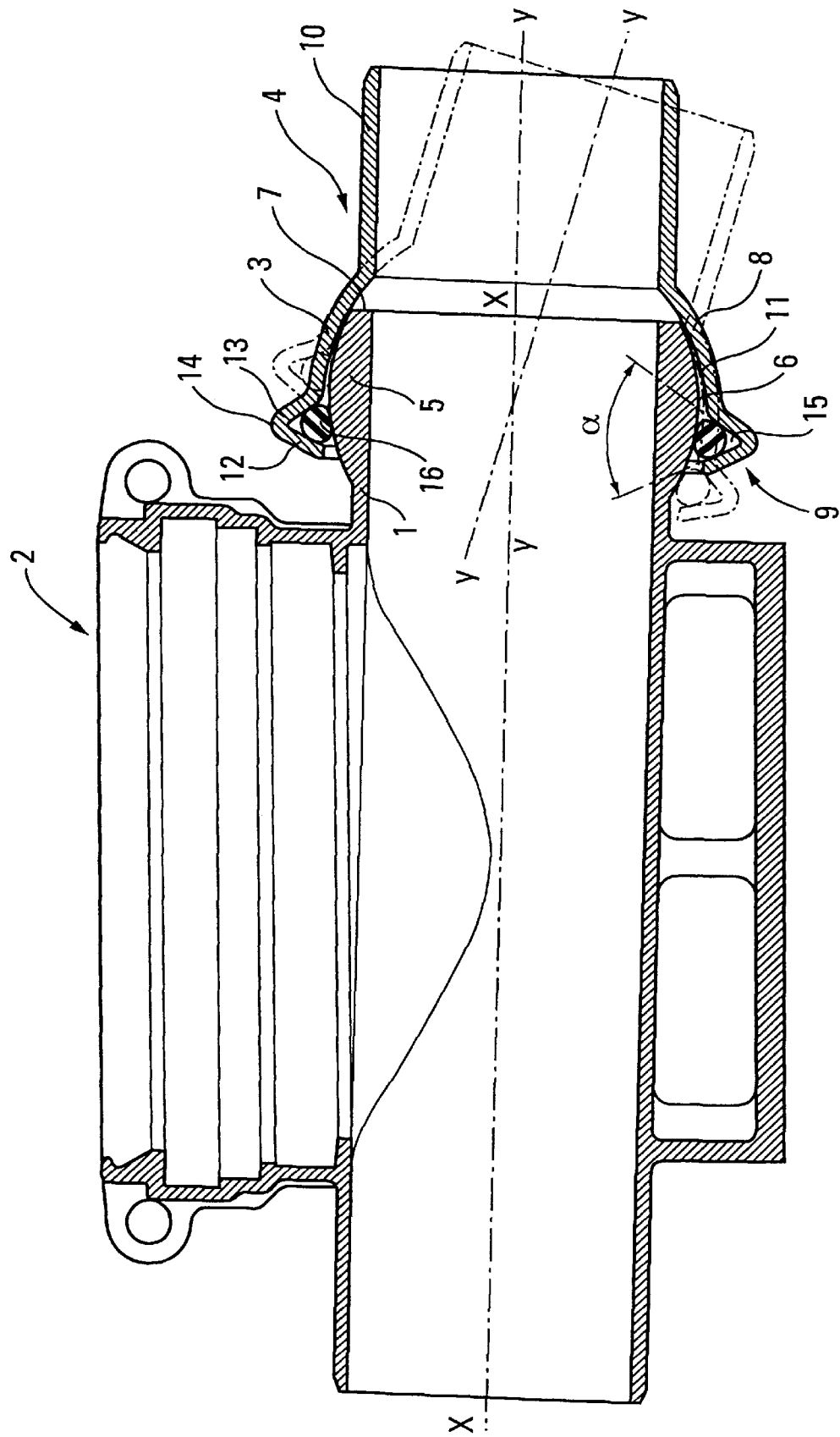

BALL AND SOCKET JOINT FOR THE WATERPROOF ASSEMBLY OF TWO PIPE ELEMENTS

BACKGROUND OF THE INVENTION

This invention relates to a ball-and-socket joint for the waterproof assembly of two pipe elements, of the type where the male end of a first pipe element has a spherical saddle designed to be inserted and pivot in a specially designed housing with a spherical profile or socket of a second pipe element, with the interposition of a waterproof elastomer ring gasket that is set in a ring groove hollowed in the internal surface of the socket.

Such a ball-and-socket joint is used for the assembly of pipe elements, notably made of ductile cast-iron, that are used in the construction of water purification pipe installations.

It is of value when it is necessary to link two pipe elements that present an angular deviation notably for the junction of two pipe elements with different axes or even, for example, to adjust the angle of a branch chamber's exit pipe to a pipe section that links said exit pipe to a main collector located deeper in the ground. The ball-and-socket joint therefore allows the rectification of the angular deviations of the pipe elements to be linked.

Such junctions must not only be waterproof but also must be resistant to movement in order to avoid the dislocation of the joint. This risk is particularly important when the pipes are subjected to the internal pressure of the fluid being transported, or even when they are buried in soft ground, or in ground that supports heavy vehicle traffic.

The known solutions that remedy to this dislocation phenomena of the spherical ball-and-socket joint are complex and costly because they rely on added locking means, of a coupler or of a nut type of which one extremity is attached to the socket and the other extremity rests on the spherical saddle of the male end in order to prohibit any dislocation.

SUMMARY OF THE INVENTION

The goal of the invention is to provide a simple and economical solution to this dislocation problem, by creating a waterproof ball-and-socket joint in which motion resistance of the male end is achieved without having to rely on added locking means.

Therefore, the object of the invention is a ball-and-socket joint of the aforementioned type, where the housing groove of the waterproofing gasket is designed and located in such a way as to constitute an expansion chamber for the elastomer gasket during the insertion of the spherical saddle in the socket and insures, in a locked position, the compression of the gasket against the outer surface of the saddle located beyond the maximum diameter of said saddle measured in a direction perpendicular to the socket axis, the waterproofing gasket being then subjected to a residual radial compression that guarantees waterproofness of the assembly and simultaneously prohibits the dislocation of the pipe elements.

According to other characteristics:

The waterproofing gasket housing groove is set in a ringed hollow located at the entrance of the socket, whose internal diameter is greater than the maximum external diameter of the spherical saddle, said hollow conforming to the spherical profile of the socket and being defined by two angled lateral surfaces that converge toward the exterior and are linked together by a curved surface;

The two lateral surfaces of the hollow form between themselves an angle ranging approximately from 45° to 70°;

The waterproofing gasket is a ring of spherical cross-section;

The ball-and-socket joint has docking means designed to prohibit any opposite-slope pipe assemblies;

BRIEF DESCRIPTION OF THE FIGURE

The invention will be best understood during the reading of the description to follow, given solely as an example and made with reference to the annexed FIGURE, in which:

The single figure shows a longitudinal cut view of a waterproof assembly of two pipe elements by the means of a ball-and-socket joint according to the invention.

DETAILED DESCRIPTION OF THE PREFERRED EMBODIMENT

In this FIGURE is shown a ball-and-socket joint between the male end 1 of axis X—X forming the exit pipe of a branch chamber 2 and the socket 3 of axis Y—Y of a pipe section 4 of nearly uniform thickness. This section 4 is linked directly, or through the intermediary of other pipe sections (not shown), to a main collector (not shown).

In the example described, the case when the male end 1 and the socket 3 are coaxial has been drawn with solid lines, the X—X axis of the male end 1 and the axis Y—Y of the socket 3 being then merged.

The male end 1 presents an extremity spherical saddle 5, with radial extension toward the outside, that thus presents an external surface 6 in the shape of a spherical portion, and ends by a radial extremity slice 7.

The socket 3 contains a spherical section 8 whose widened extremity is linked to a ring groove 9 located at the entrance of the socket, whereas the narrower extremity of the spherical part 8, located to the rear of the socket, is linked to the cylindrical shaft 10 of the pipe 4 section. The internal surface 11 of the spherical section 8 thus defines a spherical-profile housing whose dimensions allow the spherical saddle 5 to dock and pivot there, this in order to form a ball-and-socket joint that can be oriented in any direction.

To this effect, the radius of the internal surface 11 that constitutes the female spherical range is greater or equal to the radius of the external surface 6 of the saddle 5 that constitutes the male spherical range.

The hollow 9 contains two lateral surfaces 12 and 13 angled one toward the other and linked together by a curved summit 14, the two surfaces 12 and 13 forming between themselves an angle $\alpha$ ranging approximately from 45° to 70°. The rearmost lateral surface 13 is linked to the spherical section 8 by a slight curve, whereas the lateral surface 12 located at the entrance of the socket presents an internal diameter minimally greater than the maximum diameter of the external spherical range 6 of the saddle 5, this in order to allow the insertion of the male end 1 in the socket 3.

In the example described, the ring hollow 9 has a meridian profile in the shape of an isosceles triangle with a curved summit.

The hollow 9 thus defines a ring groove 15 serving to house a waterproof ring gasket 16, made of an elastomer material, that insures waterproofness between the socket 3 and the inserted male end 1.

This waterproofing gasket 16 is such that in a free state, the interior diameter of the ring is on the one hand smaller than the maximum diameter of the external spherical range 6 of the saddle 5, and on the other hand, larger or equal than the external diameter of the extremity slice 7 of said saddle 5, this in order to be able to insert the male end 1 in the socket 3.

The assembly of the ball-and-socket joint according to the invention is performed by forceful insertion of the male end 1 in the socket 3, and this with the aid of mechanical means such as a press or similar means.

During this procedure, the waterproofing gasket 16 is first increasingly compressed as the male end 1 is inserted, this until the maximum diameter of the saddle 5 is reached, this maximum diameter being measured in an axis perpendicular to that of the axis of the socket 3. During this first phase, the ring 16 is compressed between the two lateral surfaces 12 and 13 of the hollow 9 and the saddle 5, the gasket 16 pushing against the forward section of the saddle 5, that is to say on the segment of the male spherical range 6 located between the extremity slice 7 and the said maximum diameter of the saddle 5.

The maximum compression occurs as the waterproofing gasket 16 come in contact with the maximum diameter of the saddle 5, the value of the maximum diameter effectively corresponding to the maximum diameter of the spherical range 6 of the saddle.

It is to be noted that the compression of the gasket 16 simultaneously causes the expansion of the elastomer into the ring groove 15 that houses it. The groove 15 thus constitutes an expansion chamber whose volume is sufficient to allow such an expansion during the assembly of the joint.

Then, the resumption of the insertion of the male end 1 pushes the waterproofing gasket 16 beyond the maximum diameter of the saddle 5 and brings it to press against the rear section of said saddle, that is to say on the segment of the male spherical range 6 located beyond the maximum diameter and opposite the extremity slice 7 of the saddle. During this second phase, the gasket 16 is subjected to a partial decompression and automatically pushes the saddle 5 until the saddle comes to rest against the socket 3.

This position, where the extremity slice 7 of the saddle 5 rests against the female spherical range 11 of the socket 3 is the final locked position. In this locked position, the waterproofing gasket 16 stays compressed between the two lateral surfaces 12 and 13 and the exterior surface of the spherical saddle 5, the residual pressure that it sustains being sufficient to guarantee the waterproofness of the assembly.

Furthermore, the contact pressure at the location of each of the two lateral surfaces 12 and 13 creates an angled reaction whose horizontal compound is opposed to dislocation.

The ball-and-socket joint according to the invention therefore allows the waterproofing gasket to simultaneously insure the waterproofness of the junction and the retaining of the male end in the locked position.

Therefore, in a simple and economical fashion, we dispense of the use of separate locking means for the locking of the ball-and-socket joint in the locked position.

It is to be noted, in addition, that the ball-and-socket joint according to the invention allows the assembly of pipe elements displaying angular deviations as great as about 20°. On the Figure, we have also shown, in dashed lines, the assembly position of the ball-and-socket joint when the longitudinal axis X—X of the male end 1 and the axis Y—Y of the pipe section 4 are not coaxial.

Furthermore, the docking of the male end 1 at the bottom of the socket is set following a circular line, at the level of the external periphery of the extremity slice 7 of the saddle 5, which allows the angular deviation in every direction while prohibiting the decentralization that would harm the waterproofness.

Finally, when the transported fluid is flowing under the pull of gravity, it may be advantageous to equip the invention's ball-and-socket joint with means designed to prohibit any assembly in counter-slope between two pipe elements to be joined, in order not to restrict the normal flow.

Such a counter-slope assembly, in which the male end 1 and the pipe segment 4 form between themselves an elbow opened upward, can notably result from a poor assembly of the joint or from a later settlement of the ground in which these pipe elements are buried.

To eliminate this risk, it is possible to plan means (not shown), attached to the male end, that serve as docking (or stoping) to the socket to oppose any counter-slope assembly. These docking means(or stoping means), protruding radially on the external upper surface of the male end, are set along the zone linking the shaft of the male end 1 to the spherical saddle 5 without bothering the assembly of the ball-and-socket joint, and stretch along an external peripheral upper segment that defines, on each side of vertical, an angle that may reach approximately 60°. The docking means can therefore be seen as a rib that stretches along the whole of this peripheral segment, or as several docking protrusions evenly spaced along this segment.

We claim:

1. Ball-and-socket joint for waterproof assembly of two pipe elements (2, 4), of the type where the male end (1) of a first pipe element (2) has a spherical saddle (5) designed to be inserted and pivot in a specially designed housing of spherical profile (11) which is part of the socket (3) of axis Y—Y of a second pipe element (4), with interposition of a waterproofing ring gasket (16) made of elastomer that is housed in a ring groove (15) set in the internal surface of the socket (3), wherein the waterproofing gasket (16) housing groove (15) is located and designed in such a manner with a volume sufficient so that it constitutes an expansion chamber for the elastomer of the gasket (16) during and after the insertion of the spherical saddle (5) in the socket (3) and insures, in locked position, the contact of the gasket (16) on the exterior surface of the saddle (5) located beyond the maximum diameter of said saddle (5) measured in the direction perpendicular to the axis Y—Y of the socket (3), the waterproofing gasket (16) being therefore submitted to a residual radial pressure that guarantees the waterproofness of the assembly and simultaneously prohibits the dislocation of the pipe elements (2, 4).

2. Ball-and-socket joint according to claim 1, wherein the waterproof gasket (16) housing groove (15) is set in a ring hollow (9) located at the entrance of the socket, and whose interior diameter is superior to the maximum diameter of this spherical saddle (5), said hollow (9) being attached to the spherical profile housing (11) of the socket (3) and being defined by two lateral angled surfaces (12, 13) that converge toward the exterior and that are joined together by a curve (14).

3. Ball-and-socket joint according to claim 2, characterized in that the two lateral surfaces (12, 13) of the hollow (9) form between themselves and angle α that ranges approximately between 45° and 70°.

4. Ball-and-socket joint according to claim 1, wherein the waterproof gasket (16) is a ring of spherical cross-section.

5. Ball-and-socket joint according to claim 1, wherein the male end (1) of the first pipe element (2) includes means for docking in order to prohibit a counter-slope assembly of the two pipe elements (2, 4) to be joined.

* * * * *